(12) United States Patent
Tanaka

(10) Patent No.: US 7,897,309 B2
(45) Date of Patent: Mar. 1, 2011

(54) BISAZO COMPOUND, 2-HYDROXY-3-PHENYLCARBAMOYL NAPHTHALENE COMPOUND AND METHOD MANUFACTURING BISAZO COMPOUND

(75) Inventor: Yuuji Tanaka, Fujinomiya (JP)

(73) Assignee: Ricoh Company, Ltd., Tokyo (JP)

( * ) Notice: Subject to any disclaimer, the term of this patent is extended or adjusted under 35 U.S.C. 154(b) by 691 days.

(21) Appl. No.: 11/998,728

(22) Filed: Nov. 30, 2007

(65) Prior Publication Data
US 2008/0096117 A1    Apr. 24, 2008

(30) Foreign Application Priority Data
Dec. 1, 2006    (JP)    ............... 2006-325805

(51) Int. Cl.
*G03G 5/04*    (2006.01)
*C09B 35/378*    (2006.01)

(52) U.S. Cl. .................. 430/56; 534/573; 534/755

(58) Field of Classification Search .......... 430/56; 534/573, 755
See application file for complete search history.

(56) References Cited

U.S. PATENT DOCUMENTS

| 3,898,084 A | | 8/1975 | Champ et al. |
| 4,123,270 A | | 10/1978 | Heil et al. |
| 4,314,015 A | * | 2/1982 | Hashimoto et al. .......... 430/59.3 |
| 4,618,672 A | * | 10/1986 | Hashimoto .................. 534/658 |
| 4,871,633 A | * | 10/1989 | Takata et al. ............. 430/58.75 |
| 5,981,124 A | * | 11/1999 | Shimada et al. ............... 430/56 |

FOREIGN PATENT DOCUMENTS

| GB | 1 370 197 | 10/1974 |
| JP | 47-37543 | 12/1972 |
| JP | 52-8834 | 1/1977 |
| JP | 52-55643 | 5/1977 |
| JP | 08-209007 | 8/1996 |

* cited by examiner

*Primary Examiner*—Hoa V Le
(74) *Attorney, Agent, or Firm*—Cooper & Dunham LLP

(57) ABSTRACT

A bisazo compound represented by Chemical structure 1:

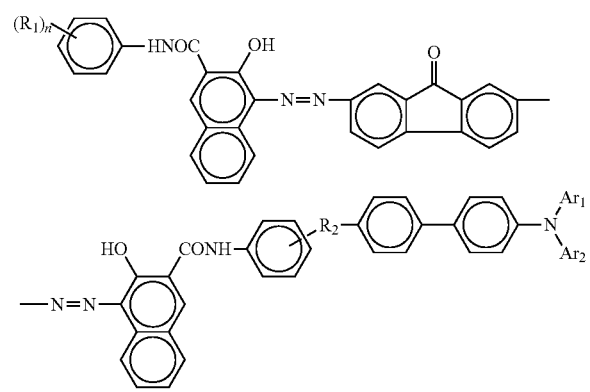

Chemical structure 1 wherein, $Ar_1$ and $Ar_2$ independently represent a substituted or non-substituted aryl group, when at least one of $Ar_1$ and $Ar_2$ has a substituent, the substituent is selected from the group consisting of an alkyl group having 1 to 4 carbon atoms, phenyl group, biphenyl group, naphthyl group, anthryl group, and pyrenyl group, $R_1$, represents an alkyl group, an alkoxy group, a halogen atom, or nitrile group, $R_2$ represents ethylene group or vinylene group, and n represents an integer of from 1 to 3 and when n is 2 or 3, $R_1$s are independent from each other.

5 Claims, 1 Drawing Sheet fBISAZO COMPOUND, 2-HYDROXY-3-PHENYLCARBAMOYL NAPHTHALENE COMPOUND AND METHOD MANUFACTURING BISAZO COMPOUND

BACKGROUND OF THE INVENTION

1. Field of the Invention

The present invention relates to a bisazo compound, 2-hydroxy-3-phenylcarbamoyl naphthalene, a manufacturing method of the bisazo compound, and an image bearing, an image forming apparatus and a process cartridge using the biazo compound.

2. Discussion of the Background

It is known that particular bisazo compounds are useful as a charge generating material for use in a charge generating layer of a laminate type image bearing member. Such a laminate type image bearing member is an image bearing member used as an electrophotographic image bearing member and has a structure in which a thin charge generating layer containing a charge generating material capable of producing a charge carrier by light and a charge transport layer to which a charge carrier produced in the thin charge generating layer is induced and transferred are accumulated on an electroconductive substrate in this order. The thin charge generating layer is formed by a suitable method (e.g., a vacuum deposition method, application of pigment solution, and application of liquid dispersion in which pigment particulates are dispersed in a resin solution). The charge transport layer is typically formed of a charge transport material and a binder resin.

As the azo compounds for use in an image bearing member, unexamined published Japanese patent applications Nos. (hereinafter referred to as JOP) S47-37543 and S52-55643 describe benzidine based bisazo compounds and JOP S52-8834 describes stilbene based bisazo compounds.

However, a laminate type image bearing member using a known azo compound generally has a low sensitivity. Therefore, such an image bearing member is not suitable for a high speed image forming apparatus, for example, a photocopier. JOP H08-209007 describes a bisazo compound in which a positive hole transport material is bonded to improve the situation. But actually, an image bearing member having a higher sensitivity is demanded.

SUMMARY OF THE INVENTION

Because of these reasons, the present inventor recognizes that a need exists for a bisazo compound useful for an image bearing member, especially for a laminate type image bearing member, a 2-hydroxy-3-phenylcarbamoyl naphthalene compound, and a method of manufacturing the bisazo compound.

As a result of the intensive study made by the present inventor, it is found that a 2-hydroxy-3-phenylcarbamoyl naphthalene compound and an aniline compound are synthesized followed by synthesis of a bisazo compound, which solves the problem mentioned above. Thus, the present invention is made.

Accordingly, an object of the present invention is to provide a bisazo compound useful for an image bearing member, especially for a laminate type image bearing member, and an intermediate compound, i.e., 2-hydroxy-3-phenylcarbamoyl naphthalene compound, for manufacturing the bisazo compound.

Briefly this object and other objects of the present invention as hereinafter described will become more readily apparent and can be attained, either individually or in combination thereof, by a bisazo compound represented by Chemical structure 1:

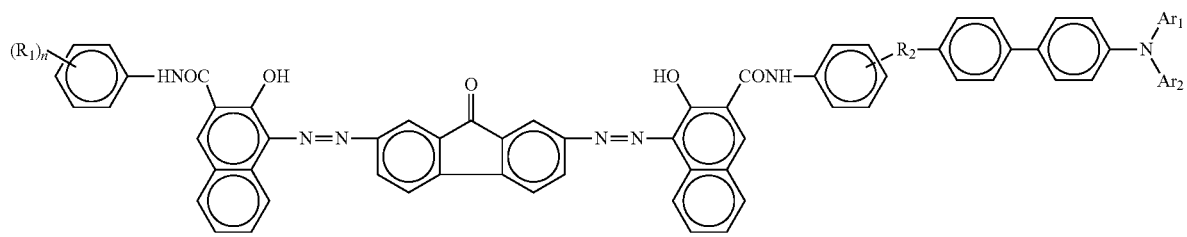

Chemical structure 1 wherein $Ar_1$ and $Ar_2$ independently represent a substituted or non-substituted aryl group, and when at least one of $Ar_1$ and $Ar_2$ has a substituent, the substituent is selected from the group consisting of an alkyl group having 1 to 4 carbon atoms, phenyl group, biphenyl group, naphthyl group, anthryl group, and pyrenyl group, $R_1$, represents an alkyl group, an alkoxy group, a halogen atom, or nitrile group, R2 represents ethylene group or vinylene group, and n represents an integer of from 1 to 3 and when n is 2 or 3, $R_1$s are independent from each other.

It is preferred that the bisazo compound mentioned above is represented by Chemical structure 2:

Chemical structure 2

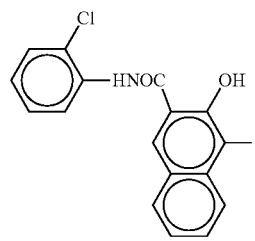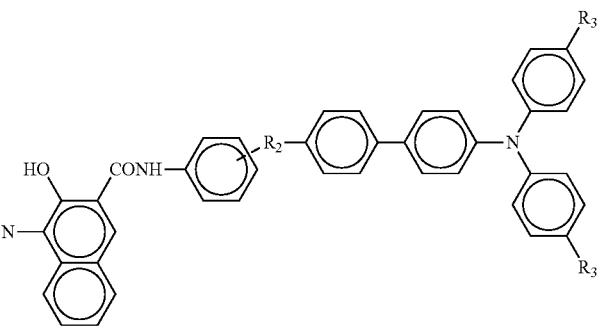

In the Chemical structure 2, $R_2$ represents ethylene group or vinylene group and $R_3$ represents alkyl group.

As another aspect of the present invention, a 2-hydroxy-3-phenylcarbamoyl naphthalene compound represented by Chemical structure 3 is provided:

Chemical structure 3

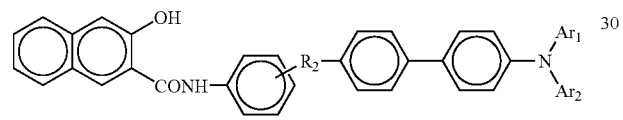

In the chemical structure 3, $Ar_1$ and $Ar_2$ independently represent a substituted or non-substituted aryl group, and when at least one of $Ar_1$ and $Ar_2$ has a substituent, the substituent is selected from the group consisting of an alkyl group having 1 to 4 carbon atoms, phenyl group, biphenyl group, naphthyl group, anthryl group, and pyrenyl group, and $R_2$ represents ethylene group or vinylene group.

It is preferred that the 2-hydroxy-3-phenylcarbamoyl naphthalene compound mentioned above is represented by Chemical structure 4:

Chemical structure 4

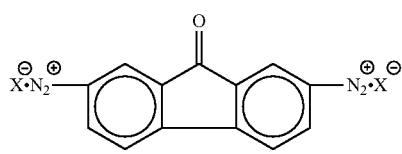

In the Chemical structure 4, $R_2$ represents ethylene group or vinylene group and $R_3$ represents hydrogen atom or alkyl group.

As another aspect of the present invention, a method of manufacturing the bisazo compound mentioned above is provided which includes conducting a reaction of a bis(diazonium) salt compound represented by Chemical structure 5, the 2-hydroxy-3-phenylcarbamoyl naphthalene compound of Chemical structure 4, and 2-hydroxy-3-phenylcarbamoyl naphthalene compound represented by Chemical structure 6, Chemical structure 5

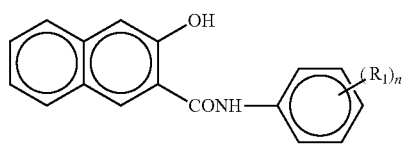

wherein X represents an anion functional group,

Chemical structure 6

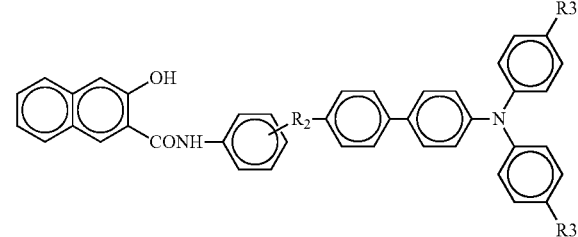

wherein $R_1$ represents hydrogen atom, an alkyl group, an alkoxy group, a halogen atom or nitro group, and when n is at least 2, $R_1$s are independent from each other.

As another aspect of the present invention, an image bearing member including a charge generating layer containing the compound is provided.

As another aspect of the present invention, an image forming apparatus including the image bearing member mentioned above is provided.

As another aspect of the present invention, a process cartridge including the image bearing member mentioned above and a developing device is provided and the process cartridge is detachably attached to the main body of an image forming apparatus.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1:
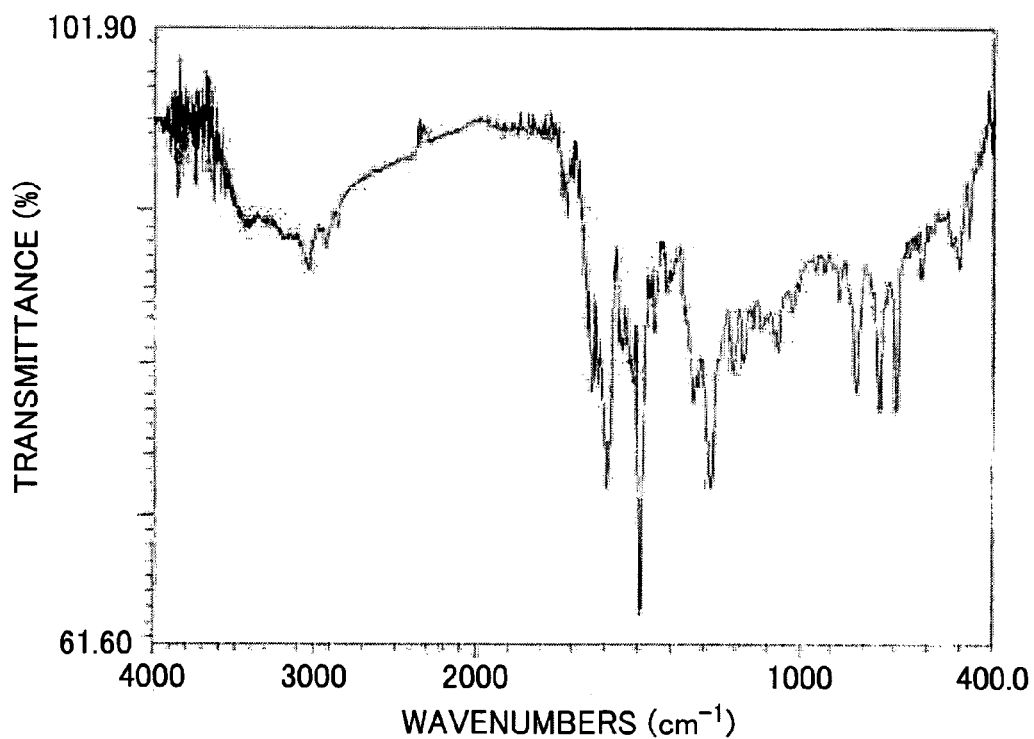
FIG. 1 is a diagram illustrating an infrared spectrum (KBr tablet method) of 2-hydroxy-3-phenylcarbamoyl naphthalene compound obtained in Example 1 described later.

The bisazo compound of the present invention is represented by Chemical structure 1:

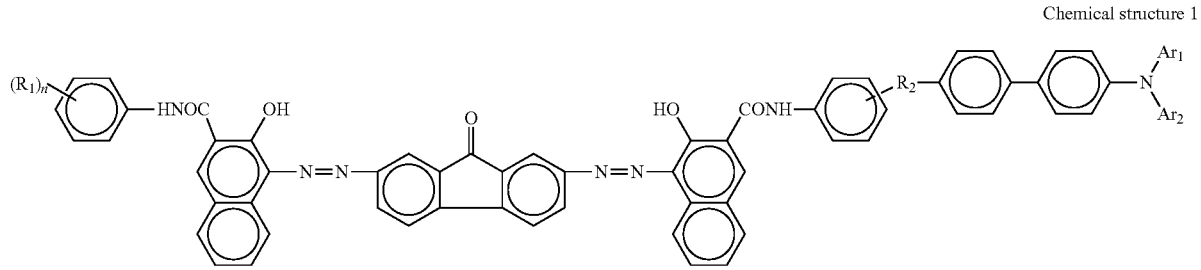

Chemical structure 1

In the chemical structure 1, $Ar_1$ and $Ar_2$ independently represent a substituted or non-substituted aryl group, and when at least one of $Ar_1$ and $Ar_2$ has a substituent, the substituent is selected from the group consisting of an alkyl group having 1 to 4 carbon atoms, phenyl group, biphenyl group, naphthyl group, anthryl group, and pyrenyl group, $R_1$ represents an alkyl group, an alkoxy group, a halogen atom, or nitrile group, $R_2$ represents ethylene group or vinylene group, and n represents an integer of from 1 to 3 and when n is 2 or 3, $R_1$s are independent from each other.

A specific example of the bisazo compounds of the present invention includes the bisazo compounds represented by Chemical structure 2:

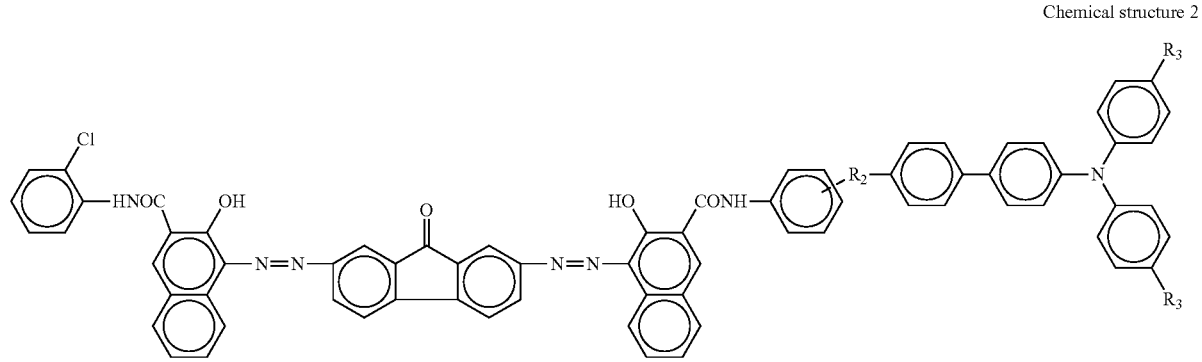

Chemical structure 2

In the Chemical structure 2, $R_2$ represents ethylene group or vinylene group and $R_3$ represents an alkyl group.

The 2-hydroxy-3-phenylcarbamoyl naphthalene-compound of the present invention is represented by Chemical structure 3:

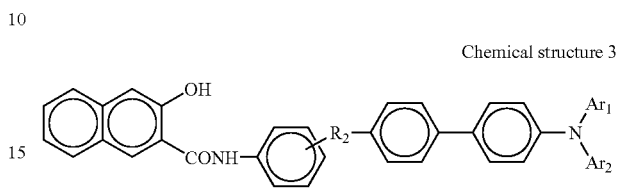

Chemical structure 3

In the Chemical structure 3, $Ar_1$, and $Ar_2$ independently represent a substituted or non-substituted aryl group, and when at least one of $Ar_1$ and $Ar_2$ has a substituent, the substituent is selected from the group consisting of an alkyl group having 1 to 4 carbon atoms, phenyl group, biphenyl group, naphthyl group, anthryl group, and pyrenyl group, and $R_2$ represents ethylene group or vinylene group.

A preferred example of the 2-hydroxy-3-phenylcarbamoyl naphthalene compound represented by Chemical structure 3 is the 2-hydroxy-3-phenylcarbamoyl naphthalene compound represented by Chemical structure 4.

Chemical structure 4

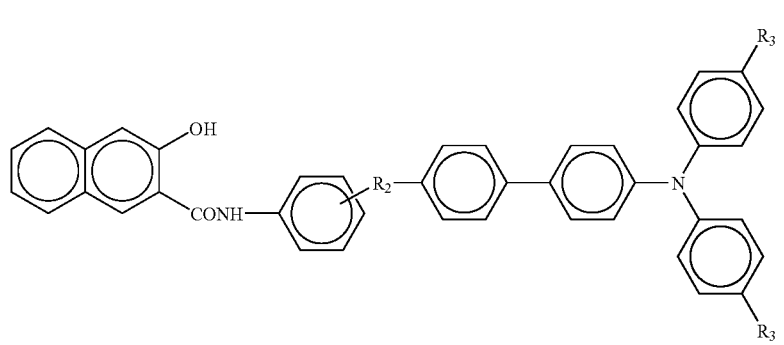

In the Chemical structure 4, $R_2$ represents ethylene group or vinylene group and $R_3$ represents hydrogen atom or alkyl group.

The 2-hydroxy-3-phenylcarbamoyl naphthalene compound of the present invention as represented by Chemical structure 4 is obtained by: (1) dissolving or dispersing 2-hydroxy-3-naphthoic acid represented by Chemical structure 7 in an organic solvent, for example, benzene, toluene and dioxane; and (2) conducting reaction between the solution or the dispersion and an aniline compound represented by Chemical structure 8. Optionally, a halogenating agent, for example, phosphorous pentachloride, phosphorous trichloride and thionyl chloride, can be added to the solution or the dispersion to isolate the resultant as an acid halide before starting (2).

Chemical structure 7

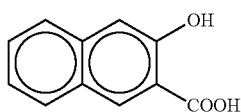

Chemical structure 8

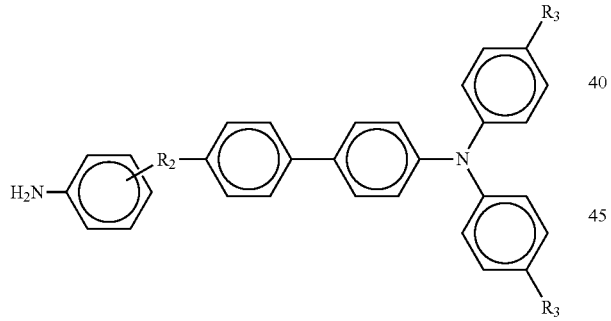

In Chemical structure 8, $R_2$ represents ethylene ($-CH_2-CH_2-$) group or vinylene ($-CH=CH-$) group and $R_3$ represents hydrogen atom or an alkyl group.

The bisazo compound of the present invention represented by Chemical structure 2 is obtained through two sequential coupling reactions.

In the first reaction, 2-hydroxy-3-phenylcarbamoyl naphthalene represented by the Chemical structure 4 is dissolved in an organic solvent, for example, N,N-dimethyl formaldehyde (DMF) and dimethyl sulfoxide (DMSO), and a bis(diazonium salt) compound represented by Chemical structure 5 is added to the solution to obtain a diazonium salt compound represented by Chemical structure 9.

Chemical structure 5

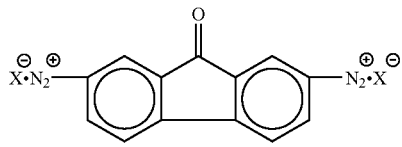

In chemical structure 5, X represents an anion functional group.

Chemical structure 9

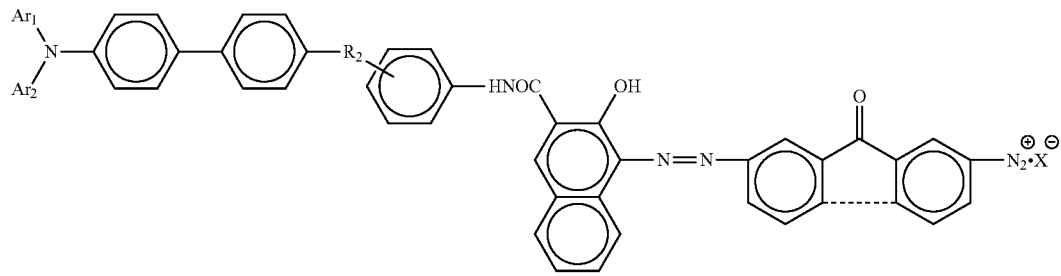

In the Chemical structure 9, $Ar_1$ and $Ar_2$ independently represent a substituted or non-substituted aryl group, and when at least one of $Ar_1$ and $Ar_2$ has a substituent, the substituent is selected from the group consisting of an alkyl group having 1 to 4 carbon atoms, phenyl group, biphenyl group, naphthyl group, anthryl group, and pyrenyl group, R2 represents ethylene (—$CH_2$—$CH_2$—) group or vinylene (—CH=CH—) group, and X represents an anion functional group.

Optionally, a base material, for example, sodium acetate solution and an organic amine, is added to complete the first coupling reaction in the first stage. The reaction temperature is preferably from about −20 to about 40° C.

Furthermore, optionally water or an acid solution, for example, dilute hydrochloric acid, is added to the diazonium salt compound of Chemical structure 9 (if added, it is desired to sufficiently cool down the diazonium salt compound so that the diazonium salt compound is not disassembled). This treatment is preferably conducted in the temperature range of not higher than 10° C. followed by filtering and isolating the diazonium salt compound.

In the second coupling reaction, 2-hydroxy-3-phenylcarbamoyl naphthalene represented by Chemical structure 6 is added to the diazonium salt compound. Optionally a base material, for example, sodium acetate and an organic amine as described for the first coupling reaction is added.

Chemical structure 6

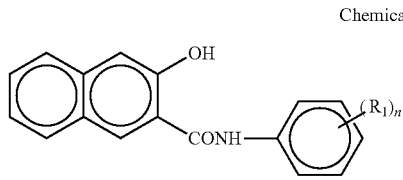

In chemical structure 6, $R_1$, represents hydrogen atom, an alkyl group, a halogen atom, nitro group, or a dialkyl group and when n is not less than 2, $R_1$s can be the same or different.

In addition, with regard to the first reaction and the second reaction mentioned above, the addition sequence of 2-hydroxy-3-phenylcarbamoyl naphthalene represented by the Chemical structure 4 and 2-hydroxy-3-phenylcarbamoyl naphthalene represented by Chemical structure 6 can be reversed, i.e., 2-hydroxy-3-phenylcarbamoyl naphthalene represented by Chemical structure 6 can be dissolved in an organic solvent first. When the sequence is reversed, the obtained diazonium salt compound is represented by Chemical structure 10.

In either case as described above, manufacturing of the bisazo compound represented by Chemical structure 2 is complete by filtering the crystal precipitated after the reaction and refining the resultant by a suitable method, for example, washing with water and/or an organic solvent, or a re-crystallization method.

Chemical structure 10

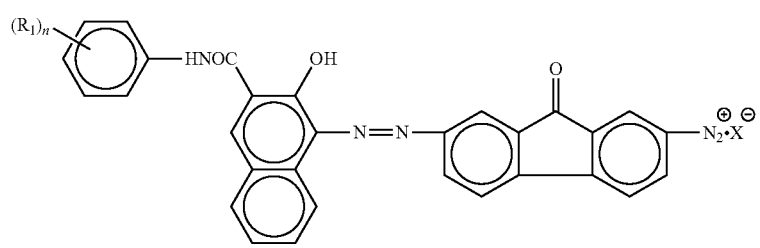

In chemical structure 10, $R_1$ is hydrogen atom, an alkyl group, an alkoxy group, a halogen atom, nitro group or a dialkylamino group; n represents an integer when $R_1$ is not hydrogen atom, and when n is not less than 2, $R_1$s are independent from each other; and X represents an anion functional group.

Specific examples of the substituent for $Ar_1$, $Ar_2$, $R_1$ and $R_3$ in Chemical structures 2, 4, 6, 7, 8, 9 and 10 include an alkyl group having 1 to 4 carbon atoms, phenyl group, biphenyl group, naphthyl group, anthryl group, pyrenyl group, an alkoxy group, a halogen atom and an aryl group. Specific examples of the alkyl group include methyl group, ethyl group, propyl group, butyl group, heptyl group and 2-methylhepthyl group. Specific examples of the alkoxy group include methoxy group, ethoxy group, propoxy group and buthoxy group. Specific examples of the halogen atom include fluorine, chlorine, bromine, and iodine. Specific examples of the aryl groups include phenyl group, biphenyl group, naphtyl group, anthryl group and pyrenyl group. The following chemical formula $X^{\ominus}$ in Chemical structures 5, 9 and 10 represents an anion functional group. Specific examples of the anion group include tetrafluoroborate, perchlorates, iodates, chlorides, bromides, sulfates, hexafluorophosphate, hexafluoroanthimonate, periodates, and p-toluene sulfonate.

The bisazo compound of the present invention represented by Chemical structure 2 is useful as a charge generating material for a laminate type electrophotographic image bearing member. Furthermore, the bisazo compound is also useful for a charge generating material for an image bearing member having a single layered photosensitive layer in which a charge generating material and a charge transport material are dispersed in a resin. In addition, the bisazo compound is also useful for an image bearing member having a photosensitive layer in which a photoconductive material is dispersed in a resin.

The bisazo compound of the present invention represented by Chemical structure 1, for example, a compound represented by Chemical structure 2, can be used for an image bearing member for electrophotography in which an image is formed by: uniformly charging an image bearing member; irradiating the image bearing member with light to form a latent electrostatic image; and developing the latent electrostatic image with a developing agent. Such an image bearing member preferably has a structure in which a photosensitive layer having a charge generating layer and a charge transport layer is provided on a substrate via an optional undercoating layer. The bisazo compound of the present invention represented by Chemical structure 1, for example, the bisazo compound represented by Chemical structure 2, can be used in the charge generating layer of such an image bearing member. An image forming apparatus using such an image bearing member is an embodiment of the present invention. Such an image forming apparatus includes, for example: respective image bearing members having a drum form for respective toner colors which contain the compound represented by Chemical structure 1, for example, the bisazo compound represented by Chemical structure 2; respective charging devices for charging the respective image bearing drums; respective optical scanning devices for forming a latent electrostatic image on the surface of the respective image bearing drums uniformly charged by the respective charging devices; respective developing devices for developing the obtained latent electrostatic image with the respective toner; a transfer device for transferring the developed image to a thin recording medium, for example, paper; and a fixing device for fixing the developed image with the recording medium. Optionally, a cleaning device for cleaning the surface of the image bearing drum after transfer can be included in the image forming apparatus. The image bearing drum and the developing device can be integrally structured as a process cartridge. The cleaning device can be optionally contained in the process cartridge. This process cartridge can be detachably attached to the main body of the image forming apparatus described above.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The bisazo compounds of the present invention and the compounds manufactured as an intermediate therefor are easily manufactured according to the description above. Examples are described below to clarify that the bisazo compound of the present invention is an effective material for an electrophotographic image bearing member, but the present invention is not limited thereto.

Example 1

Synthesis of 2-hydroxy-3-phenylcarbamoyl naphthalene Compound 3.76 g (20 mmol) of 2-hydroxy-3-naphthoic acid and 8.81 g (20 mmol) of N',N'-diphenyl-4'-(3-aminophenethyl)-4-biphenyl amine are dissolved in 50 ml of 1,4-dioxane. A solution in which 1.37 g (10 mmol) of phosphorous trichloride is diluted in 5 ml of 1,4-dioxane is dropped thereto at room temperature in 10 minutes followed by stirring under reflux for 3 hours. Subsequent to cooling down to room temperature, the content is placed in iced water and neutralized by using sodium carbonate. The produced precipitate is filtered and the resultant is washed with water followed by methanol washing. Subsequent to heating and drying with a reduced pressure, a light brown coarse crystal is obtained in an amount of 11.62 g (yield constant: 95.2%). Subsequent to refinement by silica gel column chromatography (developing solvent: toluene/ethyl acetate=5/1) and concentration with a reduced pressure, the resultant is re-crystallized by a solvent mixture of ethyl acetate and ethanol. 2-hydroxy-3-phenylcarbamoyl naphthalene compound represented by Chemical structure 11 which is colorless crystal is thus obtained in an amount of 7.94 g (yield constant: 65.0%). The melting point thereof is 272.0 to 275.0° C. The element analysis of the 2-hydroxy-3-phenylcarbamoyl naphthalene represented by Chemical structure 11 is shown in Table 1. The infrared absorption spectrum (KBr tablet method) thereof is shown in FIG. 1. The naphthalene compound of the present invention is not dissolved in a solvent, etc. Therefore, NMR identification therefor is not performed.

TABLE 1

| | Element Analysis (%) | | |
| --- | --- | --- | --- |
| | C | H | N |
| Actual value | 84.51 | 8.58 | 4.58 |
| Calculated value | 84.56 | 8.61 | 4.59 |

Chemical structure 11

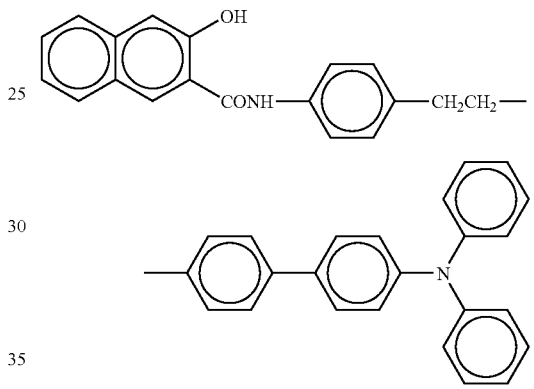

Example 2

Figure 2:
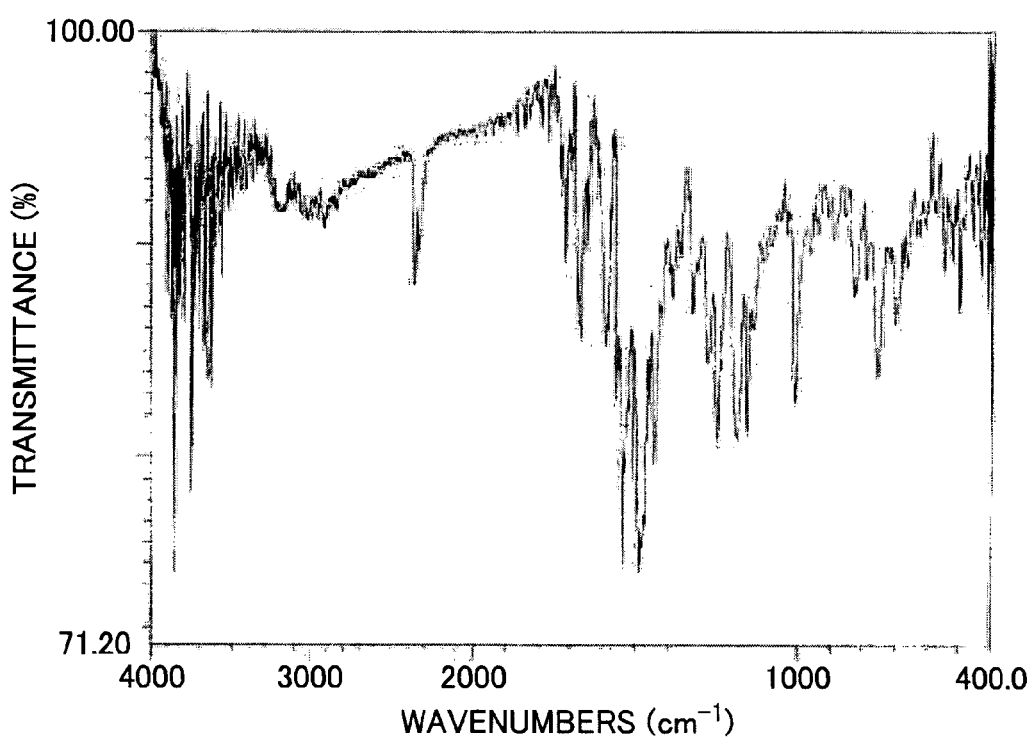
FIG. 2 is a diagram illustrating an infrared spectrum (KBr tablet method) of bisazo compound obtained in Example 2 described later.

Synthesis of Bisazo Compound 2.233 g (7.5 mmol) of 2-hydroxy-3-(2-chlorophenyl)carbamoyl naphthalene is dissolved in 300 ml of dimethylformaldehyde and then 3.058 g (7.5 mmol) of 9-fluorene-2,7-bisdiazoniumbistetra fluoroborate is added the solution at room temperature. Subsequent to stirring for 10 minutes at room temperature, a solution in which 4.58 g (7.5 mmol) of 2-hydroxy-3-phenylcarbamoyl naphthalene compound represented by Chemical structure 11 is dissolved in 300 ml of dimethylformaldehyde is added thereto. Thereafter, a solution in which 4.082 g (30 mmol) of sodium acetate trihydrate is dissolved in 25 ml of water is dropped to the resultant in 20 minutes followed by stirring at room temperature for 2 hours. The produced precipitate is filtered and the resultant is washed with 600 ml of dimethylformaldehyde heated to 80° C. three times and then 300 ml of water twice. The resultant is dried with a reduced pressure at 120° C. and the bisazo compound represented by Chemical structure 12 is obtained in an amount of 5.88 g (yield constant: 68.8%). The element analysis of the bisazo compound represented by Chemical structure 12 is shown in Table 2. The melting point thereof is not lower than 280° C. The infrared absorption spectrum (KBr tablet method) thereof is shown in FIG. 2.

TABLE 2

| | Element Analysis (%) | | |
|---|---|---|---|
| | C | H | N |
| Actual value | 76.75 | 4.35 | 8.59 |
| Calculated value | 76.87 | 4.42 | 8.60 |

Chemical structure 12

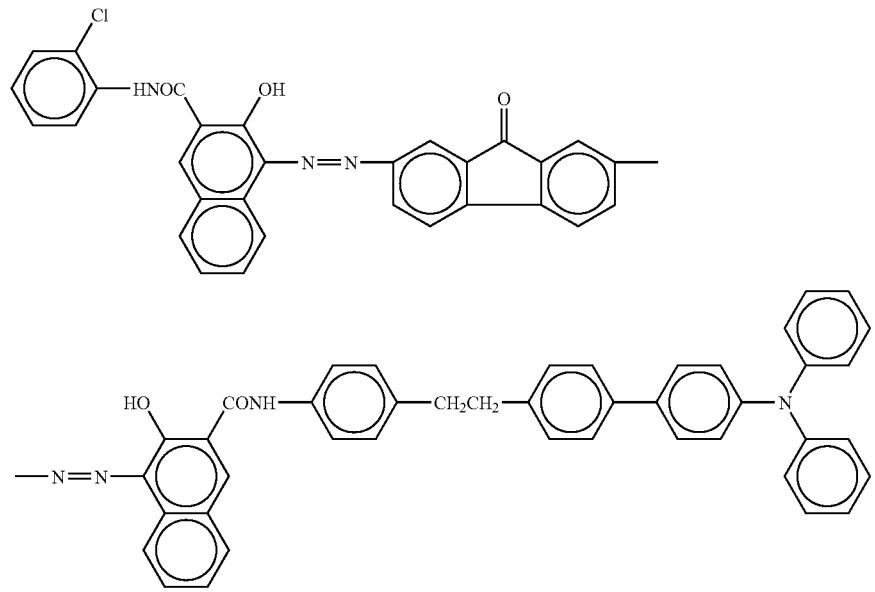

Example 3

Image Bearing Member 7.5 parts by weight of the bisazo compound represented by Chemical structure 12 obtained in Example 2 and 500 parts by weight of tetrahydrofuran solution (solid portion density: 0.5% by weight) of a polyester resin (Biron 200, manufactured by Toyobo Co., Ltd.) are pulverized and mixed in a ball mill. The obtained liquid dispersion is applied to the aluminum surface of an aluminum deposited polyester base (electroconductive substrate) by using a doctor blade followed by natural drying to form a charge generating layer having a thickness of about 1 µm.

To the charge generating layer, a solution in which 1 part by weight of 1-phenyl-3-(4-diethylaminostyryl)-5-(4-diethylaminophenyl)pyrazoline, 1 part of polycarbonate resin (PANLITE K-1300, manufactured by Teijin Limited) and 8 parts by weight of tetrahydrofuran are mixed and dissolved is applied by using a doctor blade. Subsequent to drying at 80° C. for 2 minutes and then drying at 120° C. for 5 minutes, a charge transport layer having a thickness about 20 µm is formed and thus a laminate type image bearing member is manufactured.

The obtained image bearing member is charged in a dark place by a corona discharging of about −6 kV for 20 seconds with an electrostatic photocopy testing device (EPA 8100 type, manufactured by Kawaguchi Electric Works Co., Ltd.). After being left in the dark place for another 20 seconds, the surface voltage V (V) of the image bearing member is measured. The surface is irradiated by a tungsten lamp to have an illuminance of 4.5 lux. The time (sec) to be required for V0 to be ½ by light decay is measured and the half diminishing irradiation amount E½ (lux/sec) is obtained as the sensitivity of the image bearing member. The results are shown in Table 3.

Example 4

Image Bearing Member

An image bearing member is manufactured in the same manner as in Example 3 except that 4'-diphenylamino-α-phenylstilbene is used instead as the charge transport material and the sensitivity thereof is measured as described in Example 3. The results are shown in Table 3.

Comparative Example 1

Image Bearing Member

An image bearing member is manufactured in the same manner as in Example 3 except that bisazo compound represented by Chemical structure 13 is used instead as the charge generating material and the sensitivity thereof is measured as described in Example 3. The results are shown in Table 3.

TABLE 3

Chemical structure 13

| | V0 (V) | E½ (lux/sec) |
|---|---|---|
| Example 3 | −1,081 | 0.87 |
| Example 4 | −1,078 | 0.78 |
| Comparative Example 1 | −1,088 | 1.01 |

In Table 3, an image bearing member having a large V0 is good at charging stability. When E½ of an image bearing member is small, the sensitivity thereof is good.

This document claims priority and contains subject matter related to Japanese Patent Application No. 2006-325805, filed on Dec. 1, 2006, the entire contents of which are incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A bisazo compound represented by Chemical structure 1:

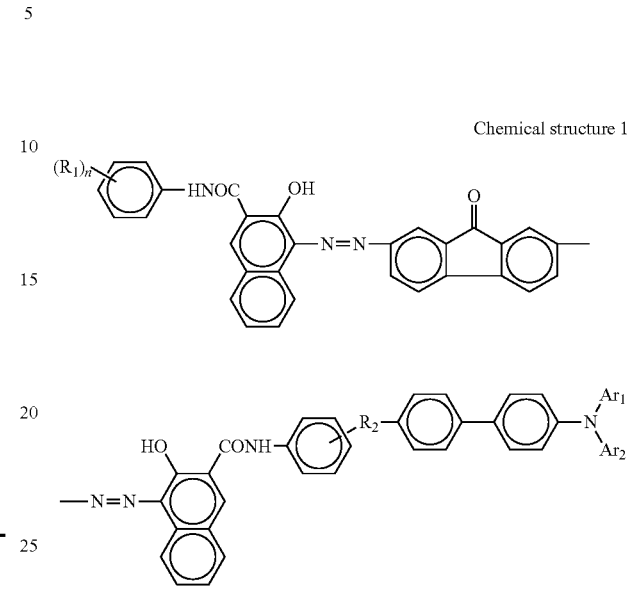

Chemical structure 1 wherein, $Ar_1$ and $Ar_2$ independently represent a substituted or non-substituted aryl group, and when at least one of $Ar_1$ and $Ar_2$ has a substituent, the substituent is selected from the group consisting of an alkyl group having 1 to 4 carbon atoms, phenyl group, biphenyl group, naphthyl group, anthryl group, and pyrenyl group, $R_1$ represents an alkyl group, an alkoxy group, a halogen atom, or nitrile group, $R_2$ represents ethylene group or vinylene group, and n represents an integer of from 1 to 3 and when n is 2 or 3, $R_1$s are independent from each other.

2. The bisazo compound according to claim 1, represented by Chemical structure 2:

Chemical structure 2 wherein, $R_2$ represents ethylene group or vinylene group and $R_3$ represents alkyl group.

3. An image bearing member comprising:
a charge generating layer comprising the bisazo compound of claim 1.

4. An image forming apparatus comprising:
the image bearing member of claim 3.

5. A process cartridge comprising:
the image bearing member of claim 3; and
a developing device,
wherein the process cartridge is detachably attached to a main body of an image forming apparatus.

* * * * *